(12) United States Patent
Schmitt et al.

(10) Patent No.: US 8,741,081 B2
(45) Date of Patent: Jun. 3, 2014

(54) JOINING METHOD, JOINING APPLIANCE AND FASTENING ELEMENT

(75) Inventors: Klaus-Gisbert Schmitt, Giessen (DE); Carsten Baer, Ingoldstadt (DE); Reinhold Opper, Giessen (DE); Simon Dietz, Giessen (DE)

(73) Assignees: Newfrey LLC, Newark, DE (US); Audi AG, Ingoldstadt (DE)

( * ) Notice: Subject to any disclaimer, the term of this patent is extended or adjusted under 35 U.S.C. 154(b) by 0 days.

(21) Appl. No.: 13/420,707

(22) Filed: Mar. 15, 2012

(65) Prior Publication Data

US 2012/0227889 A1   Sep. 13, 2012

Related U.S. Application Data

(63) Continuation of application No. PCT/EP2010/062268, filed on Aug. 23, 2010.

(30) Foreign Application Priority Data

Sep. 23, 2009 (DE) .................. 10 2009 042 467

(51) Int. Cl.
*B32B 37/00* (2006.01)
*B29C 65/00* (2006.01)

(52) U.S. Cl.
USPC .............................. 156/66; 156/297; 156/322

(58) Field of Classification Search
USPC ............. 156/72, 91, 297, 299, 309, 320, 322, 156/66, 273.9, 309.9; 219/633
See application file for complete search history.

(56) References Cited

U.S. PATENT DOCUMENTS

| 4,048,458 | A |   | 9/1977  | Kirk, Sr. |
| 4,139,408 | A |   | 2/1979  | Kobetsky |
| 4,250,596 | A | * | 2/1981  | Hara et al. ..................... 24/289 |
| 4,478,669 | A | * | 10/1984 | Zeller et al. ................ 156/379.7 |
| 4,636,124 | A |   | 1/1987  | Gugle et al. |
| 5,414,247 | A |   | 5/1995  | Geithman et al. |
| 5,475,956 | A |   | 12/1995 | Agrawal et al. |
| 5,756,185 | A | * | 5/1998  | Lesser ........................... 428/192 |

(Continued)

FOREIGN PATENT DOCUMENTS

| DE | 2 233 412    | 1/1974 |
| DE | 196 28 521 A1 | 3/1998 |

(Continued)

OTHER PUBLICATIONS

Machine translation of WO 2008/020036 date unknown.*

(Continued)

*Primary Examiner* — John Goff
(74) *Attorney, Agent, or Firm* — Harness, Dickey & Pierce, P.L.C.

(57) ABSTRACT

A method for joining a fastening element on to a surface portion of a component, the fastening element having an adhesion face, on to which there is applied an adhesive that is thermally meltable and thermally settable, comprising the steps of:
  pre-heating the adhesive to a first temperature (T1), in order to activate the adhesive;
  pre-heating the surface portion to a second temperature (T2); and
  placing the adhesion face on to the surface portion;
the adhesive undergoing main heating, to a third temperature (T3), after the adhesion face has been placed on to the surface portion, in order to set the adhesive and thereby permanently fasten the fastening element to the component.

9 Claims, 4 Drawing Sheets

(56) References Cited

U.S. PATENT DOCUMENTS

| | | |
|---|---|---|
| 6,939,421 B2 * | 9/2005 | Bremont et al. ............ 156/66 |
| 2007/0114227 A1 | 5/2007 | Stumpf et al. |
| 2007/0295698 A1 | 12/2007 | Hengel et al. |

FOREIGN PATENT DOCUMENTS

| | | |
|---|---|---|
| DE | 10 2004 012 786 | 9/2005 |
| EP | 0 823 312 A1 | 2/1998 |
| EP | 0 902 199 A1 | 3/1999 |
| EP | 1 902 903 A1 | 3/2008 |
| WO | WO 81/03028 | 10/1981 |
| WO | WO 01/51579 A1 | 7/2001 |
| WO | WO 2008/020036 | 2/2008 |

OTHER PUBLICATIONS

Written Opinion for Int'l Appl'n No. PCT/EP2010/062268; mailed on Apr. 13, 2011; 12 pp.

* cited by examiner

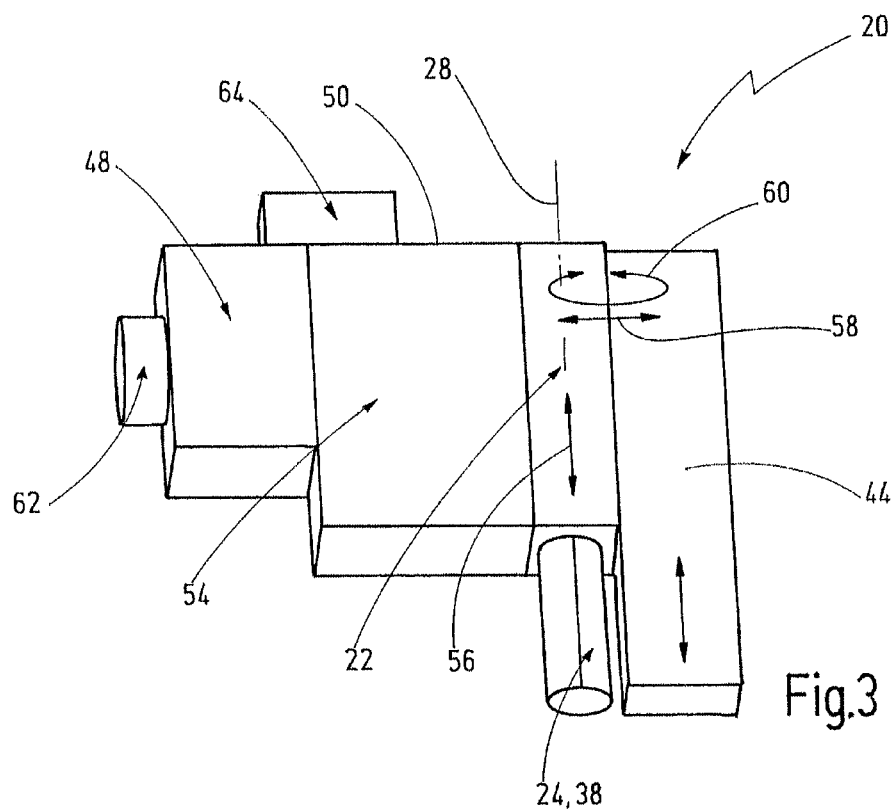
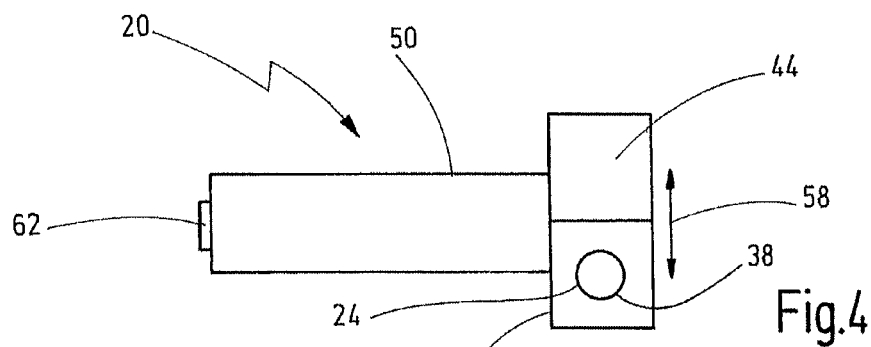
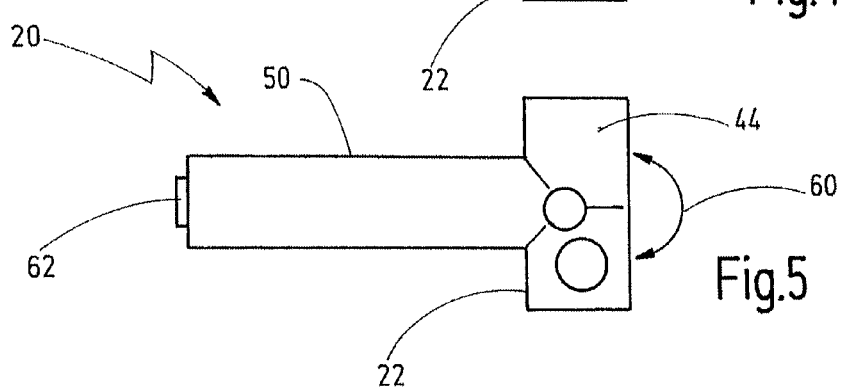

JOINING METHOD, JOINING APPLIANCE AND FASTENING ELEMENT

CROSS-REFERENCE TO RELATED APPLICATION

The present application is a continuation of pending International patent application PCT/EP2010/062268, filed Aug. 23, 2010 which designates the United States and was published in German, and which claims priority of German patent application 10 2009 042 467.9, filed Sep. 23, 2009. The disclosure of the above application is incorporated herein by reference.

FIELD OF THE INVENTION

The present invention relates to a method for joining a fastening element on to a surface portion of a component, the fastening element having an adhesion face, on to which there is applied an adhesive that is initially thermally meltable and is subsequently thermally settable.

The invention further relates to a joining appliance for joining a fastening element on to a surface portion of a component, particularly according to the aforementioned method, and relates, finally, to a fastening element as such.

BACKGROUND OF THE INVENTION

The joining method mentioned at the outset is applicable, in particular, to the domain of motor vehicle engineering. In vehicle body construction, there is a requirement for fastening elements to be fastened to components such as metal sheets (vehicle-body sheets). In this case, such fastening elements frequently serve as an anchor for fastening further items, such as, for example, electrical lines and brake lines. Frequently, in such cases, a plastic clip is fitted on to the fastening element, the said items, in turn, then being affixed to the plastic clip. It is also possible for facing parts, carpets, fittings, etc. to be locked directly on to the fastening element.

Motor-vehicle bodies are traditionally produced from metal (sheet steel or aluminium). There is known in such cases, for the purpose of joining a fastening element in the form of a stud, the practice of using so-termed stud welding, in which opposing faces of the metal sheet and of the body panel are melted on to one another by means of an arc, and a material bond is then created between the metal sheet and the stud.

There is further known the practice whereby fastening elements made of a thermoplastic material are joined to thermoplastic components, the mutually opposing surfaces being melted on to one another and, likewise, a material bond ultimately being achieved.

However, there is also a requirement for fastening elements of a general nature to be joined to any surfaces, for example, to painted metal sheets, but also to glass-fibre reinforced plastic components or carbon-fibre reinforced plastic components. Since, in recent years, there has been an increasing trend towards motor-vehicle bodies of lightweight construction, there is increasing use of glass-fibre reinforced plastic components or carbon-fibre reinforced plastic components as body parts.

The adhesive bonding of fastening elements on to components is suitable for such general joining tasks. In such cases, an adhesive is applied to an adhesion face of the fastening element. The adhesive in this case is preferably of such a type that it is applied to the adhesion face in a kind of solid state, such that the fastening component, with the adhesive applied thereto, can be provided as bulk material or the like. This is of great importance for series production.

Such adhesives are brought to a viscous state by heating, such that, after the adhesion face has been placed on to the surface portion of the component, there can be created an adhesive bond that, after setting, lasts for the service life of the motor vehicle.

A joining appliance for fastening such components to a carrier face is known from the document DE 10 2004 012 786 A1. In that case, the component is realized as a stud having a shank portion and a flange portion, being so made from an inductively heatable material. The heating of the adhesive prior to the placing on to the carrier face is effected inductively, in that induction energy is introduced into the flange portion of the fastening element via an inductive field shaper, such that the fastening element and, indirectly thereby, also the adhesive applied thereto, becomes heated. After the fastening element has been applied to the carrier component, the supply of inductive energy is stopped, and the adhesive solidifies, in order to create the adhesive bond.

A further appliance for adhesive bonding of fastening elements to carrier faces is known from the document EP 1 250 391 B1, wherein the fastening elements are coated with a hot-melt adhesive that can be reactivated through the action of heat. Prior to the application to the carrier face, the adhesive is heated by means of hot air, the carrier face being heated at the same time. The heat supply is stopped after the fastening element has been placed on to the carrier face. Tacking of the fastening element on to the carrier face is achieved in this manner. How the subsequent final setting and final curing of the adhesive are effected, is not stated in this document. The adhesive bond obtained in that case is intended only to achieve a functional strength that enables the adhesive-bonded part to be conveyed without difficulty.

In large-scale series production, the time period required for executing the joining procedure is particularly important. Existing approaches to the execution of adhesion procedures frequently require a time period of two minutes or more. This is significantly longer than in the case of the stud welding mentioned at the outset, such that there is a need to reduce this time period.

Against the above background, it is the object of the invention to provide an improved joining method, an improved joining appliance and an improved fastening part.

SUMMARY OF THE INVENTION

This object is achieved, on the one hand, by a method for joining a fastening element on to a surface portion of a component, the fastening element having an adhesion face, on to which there is applied an adhesive that is thermally meltable and thermally settable, comprising the steps of first pre-heating the adhesive to a first temperature, in order to melt the adhesive; pre-heating the surface portion to a second temperature; and placing the adhesion face on to the surface portion, the adhesive undergoing main heating, to a third temperature, after the adhesion face has been placed on to the surface portion, in order to set the adhesive and thereby permanently fasten the fastening element to the component.

The above object is further achieved by a joining appliance for joining a fastening element on to a surface portion of a component, particularly according to the above-mentioned method, the fastening element having an adhesion face, on to which there is applied an adhesive that is thermally meltable and thermally settable; comprising a holding device for holding a fastening element, the holding device being designed to be moved along a joining axis; comprising at least one heating device, which is designed to heat the adhesive and the surface portion; and comprising a control device, the control device being designed so to control the at least one heating device that the adhesive is first pre-heated, the holding device is then moved on to the component, in order to place the fastening element on to the surface portion, and the at least one heating device is finally so controlled that the adhesive between the fastening element and the surface portion is heated for the purpose of setting this adhesive.

Finally, the above object is achieved by a fastening element that is suitable, in particular, for use with the above-mentioned method, the fastening element having a shank portion and having a flange portion, which adjoins the shank portion and has a larger cross-sectional area than the shank portion, the flange portion having an adhesion face, on to which there is applied an adhesive that is thermally meltable and thermally settable, at least one spacing protuberance being realized on the adhesion face, and preferably at least one elevation being realized on the side of the flange portion that is opposite the adhesion face.

The joining method according to the invention and the joining appliance according to the invention enable fastening elements to be adhesion-bonded to surface portions of components, this being within very short time periods, of less than 60 seconds, preferably less than 30 seconds, in particular less than 10 seconds.

A reason for this is that, before the adhesion face is placed on to the surface portion, not only is the adhesive pre-heated to a first temperature, but the surface portion is also pre-heated to a second temperature, the second temperature preferably being approximately equal to the first temperature (for example, in the range of greater than 100° C. and less than 200° C.).

Further, this is achieved in that the adhesive, after the placing-on of the adhesion surface, undergoes main heating to a third temperature, in order to set the adhesive. In this case, the main heating to the third temperature is preferably to be so effected that the adhesive undergoes final curing.

The adhesive is preferably based on an epoxy resin that is curable in a relatively short period of time.

In this case, the duration of the adhesion process and the quality of the adhesion can be influenced in a determinant manner by the pre-heating of the surface portion.

Owing to the pre-heating of the surface portion, it is possible in this case to achieve a situation in which the adhesive does not cool down again after the placing-on operation. In other words, there is no occurrence of a large temperature gradient between the fastening element and the component. It is thereby possible to prevent a situation in which adhesive is already cured directly on the adhesion face but moisture is still evaporating on the component, the moisture delaying an adhesive bond between the adhesive and the component. The pre-heating of the surface portion also effects a kind of cleaning, since, owing to the pre-heating, impurities on the surface portion are more easily released or, ideally, release themselves (through moisture being diffused or evaporated out of the component). Releasing-agent residues are also removed by the pre-heating of the surface portion.

Immediately succeeding the pre-heating of the adhesive and the surface portion, and the placing of the adhesion face on to the surface portion, the final curing of the adhesive, and consequently the complete setting of the adhesive, is preferably effected by the main heating step.

Owing to the realization of spacing protuberances on the adhesion face, it is possible for the adhesion face to be placed on to the surface portion by the application of a predefined force to the fastening element, the spacing protuberances bearing on the surface portion and consequently providing for a predefined spacing between the adhesion face and the surface portion (and preferably also for a sufficient parallelism therebetween).

The height of the spacing protuberances relative to the adhesion face is preferably less than the height of the thermally meltable and thermally settable adhesive applied thereto.

A thermally meltable and thermally settable adhesive is preferably to be understood to be an adhesive that, being in a liquid or highly viscous state, has been applied to an adhesion face and has not yet undergone final curing, in such a way that the adhesive can be melted thermally, or by heat, and can be set by greater heat.

If no spacing protuberances are provided on the adhesion face, the distance between the adhesion face and the surface portion can also be set in another manner, for example through regulation of a force and/or of a position by/at which the fastening element is placed on to the component.

In the present case, therefore, the term placing-on of the adhesion face is to be so understood that the adhesion face is placed on to the surface portion at a certain distance from the latter, i.e. is brought close to the surface portion, in order to prevent the pre-heated adhesive between the adhesion face and the surface portion from being completely displaced.

Overall, it is preferred, in the case of the method according to the invention, if all heating steps can be effected from a joining side of the component. In vehicle-body construction, in particular, this is important, since frequently the body components used therein are accessible from one side only.

The fastening element can be constructed from various materials, for example from a thermosetting plastic or a metal. If plastic is used for the fastening element, it is preferred that metal particles be embedded therein, to enable the fastening element to be heated inductively.

Preferably, metallic particles are mixed likewise with the adhesive or, also, with the adhesive alone, in order to facilitate the most rapid possible heating of the adhesive.

The component can be a metallic component, painted or unpainted. Further, the component can be a plastic component, particularly of thermosetting plastic, a glass-fibre reinforced plastic component or a carbon-fibre reinforced plastic component. For the purpose of facilitated heating of plastic, glass-fibre reinforced plastic or carbon-fibre reinforced plastic (preferably having a thermosetting matrix resin), it can be preferred that particles having better conductivity (particularly metallic particles or a metallic lattice or the like) be moulded into the component, at least in the region of the surface portion, such that these particles are not visible from the outside.

After the adhesive has undergone the main heating and has set, it may be necessary, if appropriate, to cool the adhesion site. It may also be necessary for the at least one heating device to be cooled down again before a new fastening element is inserted.

In the case of the joining method according to the invention, it is particularly advantageous if the third temperature is equal to the first temperature, particularly preferably higher than the first temperature. The third temperature can be, for example, in the region of greater than 150°.

Further, it is advantageous if the pre-heating of the adhesive and/or the main heating of the adhesive includes the heating of the fastening element, heat conduction being effected from the fastening element into the adhesive.

In this way, it is possible for the adhesive to be heated indirectly.

According to a further preferred embodiment, the heating of the fastening element and/or the pre-heating of the component includes inductive heating.

The heating of the fastening element by inductive techniques is known, for example, from the document DE 10 2004 012 786 A1 mentioned at the outset.

However, an inductive heat source can also be used to pre-heat the component, the component being able to contain metal, but also being able to be composed entirely of glass-fibre reinforced plastic or carbon-fibre reinforced plastic (these materials also have a certain conductivity, such that indirect heating is possible).

Further, it is preferred if the pre-heating of the component includes heating by thermal convection and/or by thermal radiation. Such pre-heating preferably includes IR thermal radiation that is directed on to the surface portion, and/or the directing of hot air on to the surface portion, and/or the use of a laser to heat the surface portion (for example, in a scanning manner).

The heating of the component can also be effected in this manner, although inductive heating of the fastening element, or of the adhesive, is preferred.

Finally, it is also possible to use electrical resistance heat or frictional heat for the purpose of heating the adhesive, or the surface portion.

All of these heating methods can be used individually or in combination.

Overall, it is further advantageous if the pre-heating of the fastening element and the pre-heating of the surface portion are effected with an overlap of time.

This enables the process time to be shortened. Further, the pre-heating of the fastening element and the pre-heating of the surface portion can be effected by a single heating means, although in these cases it may also be preferred to provide separate heating means for these purposes.

It is particularly advantageous in this case if, prior to the pre-heating, the fastening element is moved into a defined spatial position in relation to the component.

The defined spatial position can be, for example, a position parallel to the component surfaces, at a short distance therefrom. In the case of such a relative positioning, means for pre-heating the fastening element and means for pre-heating the surface portion can be integrated, in a relatively simple manner, into a joining tool that is either guided by hand or moved by means of a robot.

According to an alternative embodiment, the pre-heating of the adhesive and the pre-heating of the surface portion are effected in succession of time.

In the case of this embodiment, it is possible to use separate heating means, which preferably can be moved independently of one another. This preferred method is suitable, in particular, for realizing a plurality of fastening elements on components, in rapid succession. In this case, the surface portion of a succeeding joining site can be already pre-heated while a main heating operation is being performed.

It is preferred in this case if the pre-heating of the surface portion and the placing of the pre-heated adhesion face on to the surface portion are linked through control in such a way that the placing-on is allowable only within a predefined timespan after completion of the pre-heating of the surface portion.

In the case of this embodiment, it is possible to prevent the surface portion from cooling down again to the extent that the advantages according to the invention are no longer sufficiently achievable. This applies, in particular, if the pre-heating of the adhesive and the pre-heating of the surface portion are effected in succession of time.

Generally, it is also possible, preferably, for the surface portion to be heated, in the sequential heating, to an increased temperature, which, for example, is higher than the first temperature. In this case, account can be taken of the period of time until the fastening element is placed on to the pre-heated surface portion, for example in such a way that the cooling of the surface portion is effected such that, on the placing-on of the fastening element, the surface portion has approximately the same temperature as the pre-heated adhesive.

Overall, it is further preferred if at least one first and one second fastening element are joined on to a first and a second surface portion, respectively, the main heating of the first fastening element and the pre-heating of the second surface portion being effected with an overlap of time.

This embodiment is suitable, in particular, if a plurality of fastening elements are to be joined to components. The "interleaving" of the heating processes enables a significantly shorter process cycle time to be achieved overall. Clearly, this also applies, in particular, if the pre-heating of a surface portion is effected by means of a heating means that is independent of the heating means for pre-heating the adhesive. If the fastening elements are to be applied in predetermined patterns, or distances from one another, these heating means can also be provided at a corresponding distance from one another, on a single housing.

In the case of the joining appliance according to the invention, it is preferred if the at least one heating device has first heating means, for heating the adhesive, and has second heating means, for heating the surface portion, the first heating means and the holding device being arranged on a housing of a joining tool.

In the joining tool, a fastening element that is to be joined can be held by means of the holding device. A fastening element held in such a manner, or the adhesive applied thereto, can then be heated by means of the first heating means, while the fastening element is held on the holding device. The holding device can then be moved along the joining axis, on to the component, in order to place the adhesion face on to the surface portion.

According to a preferred embodiment, the second heating means are also arranged on the housing of the joining tool.

This renders possible a simple and compact structure, which is also suitable, for example, for hand-held pistol applications.

The first heating means are preferably inductive heating means. The second heating means are preferably IR thermal radiation heating means, hot-air heating means or laser heating means.

Further, it is preferred in this case if a unit constituted by the holding device and the first heating means and/or the second heating means is realized to be displaceable on the joining tool.

This makes it possible to achieve a situation, for example, whereby the joining tool is moved into a predefined position for a first joining process, and the surface portion is pre-heated in a first displacement position of the second heating means, while, overlapping this operation, the first heating means heat the adhesive. The position of the unit constituted by the holding device and the first heating means and the position of the second heating means can then be quasi-interchanged, such that the actual joining process, with the placing of the adhesion face on to the component, being possible without movement of the housing of the joining tool.

According to a further preferred embodiment, a unit, constituted by the holding device and the first heating means, and the second heating means are movable independently of one another.

This embodiment is suitable, in particular, for simple manual applications, or for automated applications in which a plurality of fastening elements are to be joined to components in rapid succession. In such cases, a succeeding surface portion then already undergoes pre-heating while a joining operation is being performed, which surface portion then already has the appropriate pre-heating temperature when the succeeding component has been taken over by the joining tool and its adhesive has been heated.

Generally, the method according to the invention can be performed with a single heating means for the pre-heating steps and the main heating step. This can be, for example, an inductive heating means. Alternatively, it is possible to provide mutually separate heating means for heating of the adhesive, on the one hand, and for heating of the surface portion, on the other hand.

The fastening element can be a metallic or thermosetting plastic stud having a fastening region (e.g. screw-thread or snap closure) for accommodating e.g. screw connections or plastics. A thermosetting plastic fastening element in the form of a clip can have, for example, a fastening region (e.g. clamping closure for accommodating lines or small components).

The fastening element preferably has an adhesion base, on which the adhesion face is realized. The applied adhesive, which is pre-applied but still able to be reactivated, is provided on the adhesion face.

The adhesive used is preferably thermally meltable and settable (curable), and has, for example, epoxy resin as a main constituent.

Particularly in the case of fastening elements being joined, according to the method according to the invention, on to glass-fibre reinforced plastic components or carbon-fibre reinforced plastic components, the pre-heating of the surface portion has the advantage that moisture and releasing-agent residues can be removed from the component, such that uniform cleaning and activation of the surfaces can be effected in the adhesion zone before the actual setting or curing (final curing) of the adhesive is effected.

It is understood that the above-mentioned features and those to be explained in the following can be applied, not only in the respectively specified combination, but also in other combinations or singly, without departure from the scope of the present invention.

BRIEF DESCRIPTION OF THE DRAWINGS

Exemplary embodiments of the invention are represented in the drawing and described more fully in the following description. In the drawing:

FIG. 3 shows a schematic, perspective representation of a further embodiment of a joining tool of a joining appliance according to the invention;

FIG. 4 shows a schematic top view of a further embodiment of a joining tool of a joining appliance according to the invention;

FIG. 5 shows a schematic top view of a further embodiment of a joining tool of a joining appliance according to the invention;

DETAILED DESCRIPTION OF THE PREFERRED EMBODIMENTS

Figure 1:
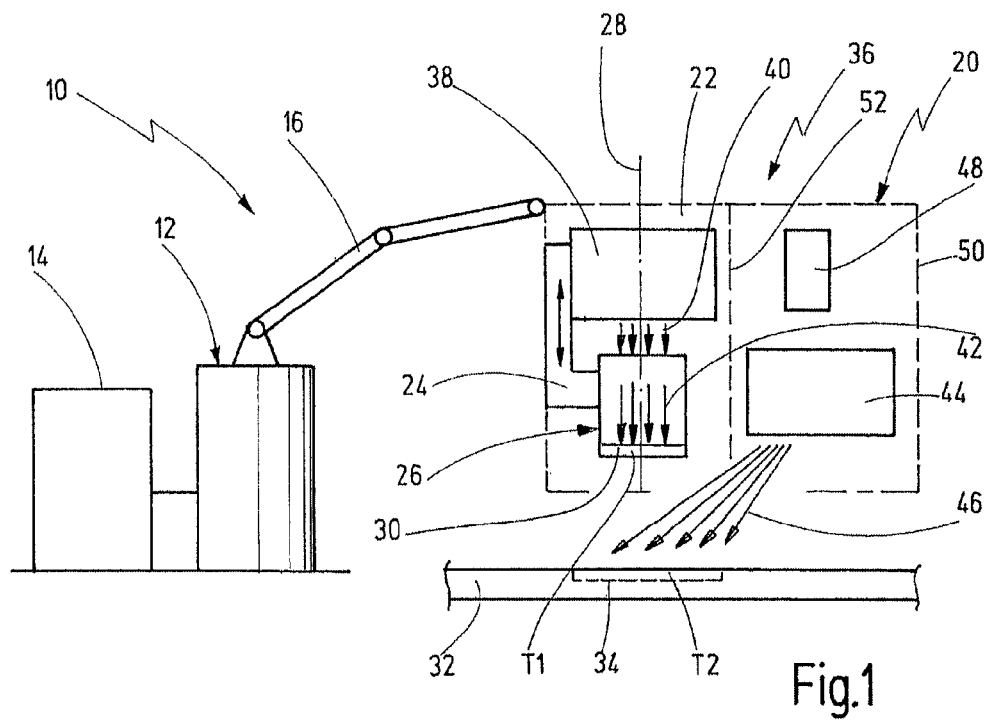
FIG. 1 shows a schematic representation of an embodiment of a joining appliance according to the invention, in a pre-heating step.

In FIG. 1, a first embodiment of a joining appliance according to the invention is denoted by the general reference 10. The joining appliance 10 comprises a robot 12, which, in a manner known per se, has at least one arm 16. Further, the joining appliance 10 has a control/energy-supply unit 14, which is connected to the robot 12.

Arranged on the arm 16 is a joining head 20, which is connected to the control/energy-supply unit 14 via a flexible tube combination (not represented). The joining head 20 comprises a joining tool 22. The joining tool 22 has a holding device 24 for a fastening element 26, and is designed to be moved, with a fastening element 26 held thereon, along a joining axis 28, as indicated by a double arrow.

The fastening element 26 has an adhesion surface, not denoted in a more detailed manner, on to which there is applied an adhesive 30 that is initially thermally meltable and is thereafter thermally settable.

The joining appliance 10 is designed to join the fastening element 26 on to a component 32, along the joining axis 28. More precisely, the fastening element 26 is adhesive-bonded on to a surface portion 34 of the component 32, being so bonded by thermal melting and thermal setting of the adhesive 30, by the adhesion face being placed on to the surface portion 34 and by thermal setting, or curing, of the adhesive 30.

The joining head 20 further comprises a heating device 36. The heating device 36 has first heating means 38, which are arranged on the joining tool 22. The first heating means 38 are designed to heat the adhesive 30, in order first to melt and subsequently to set the latter. The first heating means 38 can be designed to heat the adhesive 30 directly. In the present case, however, the heating of the adhesive 30 is effected in that the heating means 38 heat the fastening element 26, this being through a heat transfer 40. Further, heating of the adhesive 30 occurs through a heat transfer 42 within the fastening element 26. It is understood that, in this case, the fastening element 26 is preferably realized to have good thermal conduction, thus, for example, is made of a metallic material or of a plastic material having thermally conductive (metallic) particles included therein.

The joining head 20 further comprises second heating means 44, which are arranged adjacently to the joining tool 22. The joining tool 22 can be moved relative to the second heating means 44, along the joining axis 28. The second heating means 44 are designed to heat the surface portion 34, this being through heat transfer 46. Further, the joining head 20 comprises a control device 48, which is arranged, together with the second heating means 44, in a housing 50. The joining tool 22 can be moved relative to the housing 50, along the joining axis 28. The drawing shows a parting line 52, in order to elucidate the relative movement capability between the joining tool 22 and the housing 50. As an alternative thereto, however, the second heating means 44 can also be moved with the joining tool 22.

Figure 2:
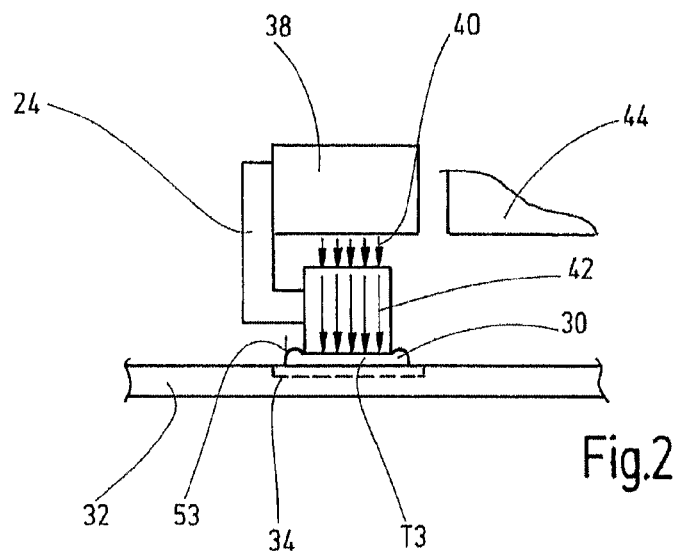
FIG. 2 shows a part of the joining appliance of FIG. 1, in a main heating step.

By means of the joining appliance 10, a joining operation can be performed as follows. The joining head 20 is first moved, by means of the robot 12, into a position in which the fastening element 26 is arranged in the region of the surface portion 34, and in which the second heating means 44 are in a position such that the surface portion 34 can be heated. The first heating means 38 are then switched on (or have already been switched on), in order to heat the adhesive 30 to a first temperature T1, which, for example, can be greater than 100° C. and less than 200° C. Further, overlapping this or simultaneously therewith, the second heating means 44 are switched on, in order to heat the surface portion 34, this being to a second temperature T2, which is preferably approximately equal to the first temperature T1. The joining tool 22 is then lowered, along the joining axis 28, on to the surface portion 34, such that the adhesive 30, which is viscous as a result of the heating, comes to bear on the likewise pre-heated surface portion 34. The second heating means 44 are then switched off, or are switched off shortly beforehand. The fastening element 26 is held in a position in which the adhesion face of the fastening element 26 is somewhat spaced apart from the surface portion 34. The position is so selected, however, that the viscous adhesive 30 is displaced radially outwards to a certain extent, such that a bead 53 is produced around the outside of the fastening element 26, as represented in FIG. 2. In this state, the first heating means 38 are operated to heat the adhesive 30 to a third temperature T3, which can be equal to the first temperature T1 or to the second temperature T2, but which is preferably greater than the first temperature T1 and the second temperature T2. The third temperature T3 can be, for example, greater than 150° C., and even greater than 200° C., if appropriate. The heating of the adhesive 30 to the third temperature T3 causes the adhesive 30 to undergo curing, ideally complete curing, this being until the adhesive has set completely and its substantially complete adhesive strength has been attained.

The joining tool 22 is then moved back again, the holding device 24 releasing the fastening element 26 that has now been joined on to the component 32. A further fastening element 26, which is to be joined on to a further surface portion 34, can then be taken up by the holding device 24. If appropriate, it may be advantageous to cool the adhesive 30 (for example, by means of cooling air) after the second heating means 44 have been switched off. If appropriate, it may also be advantageous to cool the holding device 24, in order that a newly taken-up fastening element 26 does not undergo excessive heating from the start.

Further embodiments of joining appliances, joining tools and joining methods to be performed therewith are explained in the following. These are based generally, in respect of structure and functioning, on the joining appliance 10 described with reference to FIGS. 1 and 2. Elements that are the same are therefore denoted by the same references. Substantially, the differences are explained in the following.

FIG. 3 shows a further embodiment of a joining head 20. The joining head 20 comprises a pneumatic means 54, by means of which, for example, the movement of the joining tool along the joining axis 28 is produced, the joining movement being shown at 56.

Further, the joining tool 22 and the second heating means 44 can be movable, relative to the housing 50, between at least two alternating positions, this again being produced by the pneumatic means 54. It is thereby possible, for example, that the second heating means 44 first be arranged directly above the surface portion 34, in order to pre-heat the latter. The positions of the second heating means 44 and the joining tool 22 can then be "interchanged", such that the joining tool 22 is then arranged immediately above the surface portion 34. These alternating movements can either be effected linearly in relation to the housing 50, as shown at 58, or through rotational movements, as shown at 60.

Further provided on the housing 50 is the control device 48, as well as a robot dock 62 for attaching the joining head 20 to an arm 16 of the robot 12. Finally, the joining head 20 has a connector 64 for a flexible tube combination. The flexible tube combination can be used to supply, for example, compressed air for the pneumatic means 54, but also electrical energy for operating the heating means 38, 44, etc.

Such a joining head 20 is shown in a schematic top view in FIG. 4, in which it is shown that the second heating means 44 and the joining tool 22 can be moved, relative to the housing 50, in a linear alternating movement 58. Shown in corresponding manner in FIG. 5 is a joining head 20 in which the second heating means 44 and the joining tool 22 are rotatable about a common rotational axis, as shown by an indicated rotational alternating movement 60.

Figure 6:
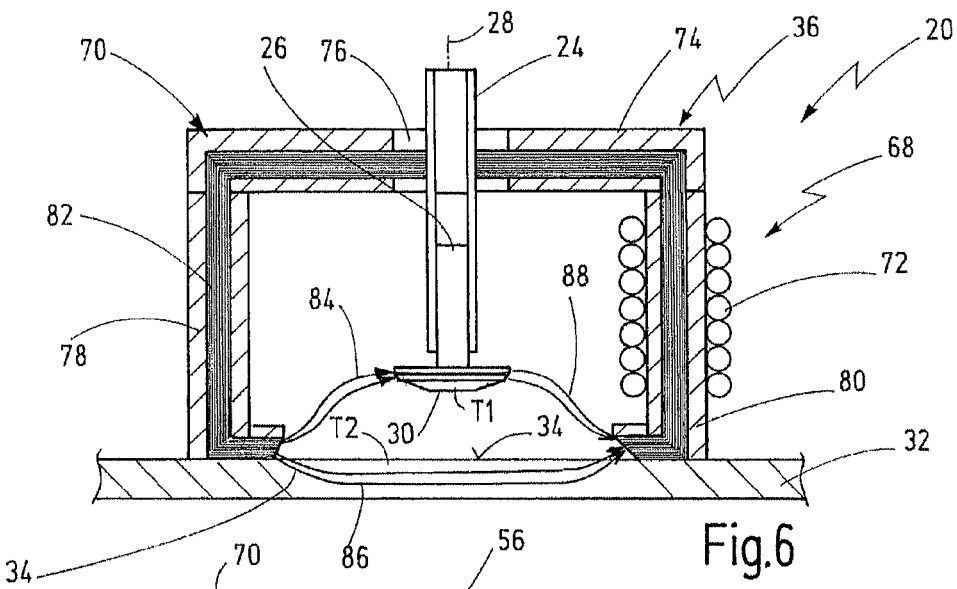
FIG. 6 shows a further embodiment of a joining tool of a joining appliance according to the invention, in a pre-heating step.
Figure 7:
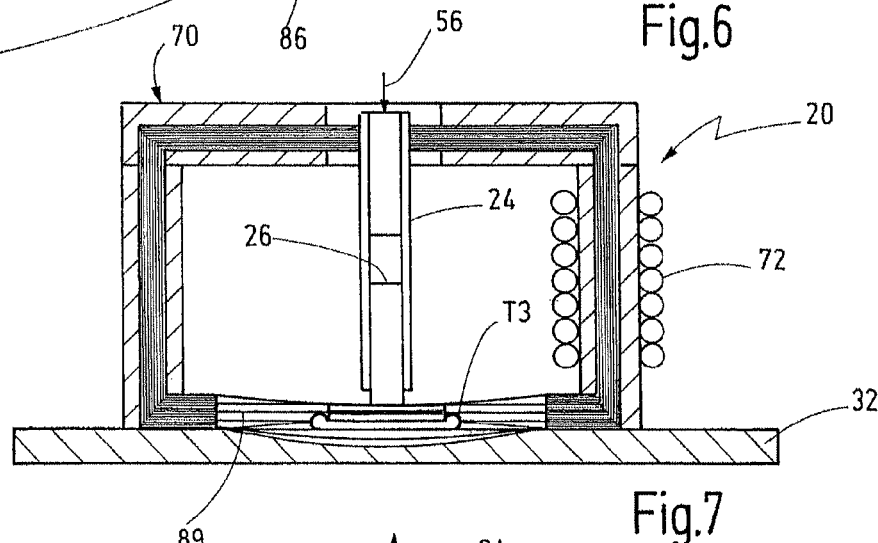
FIG. 7 shows the joining tool of FIG. 6, in a main heating step.
Figure 8:
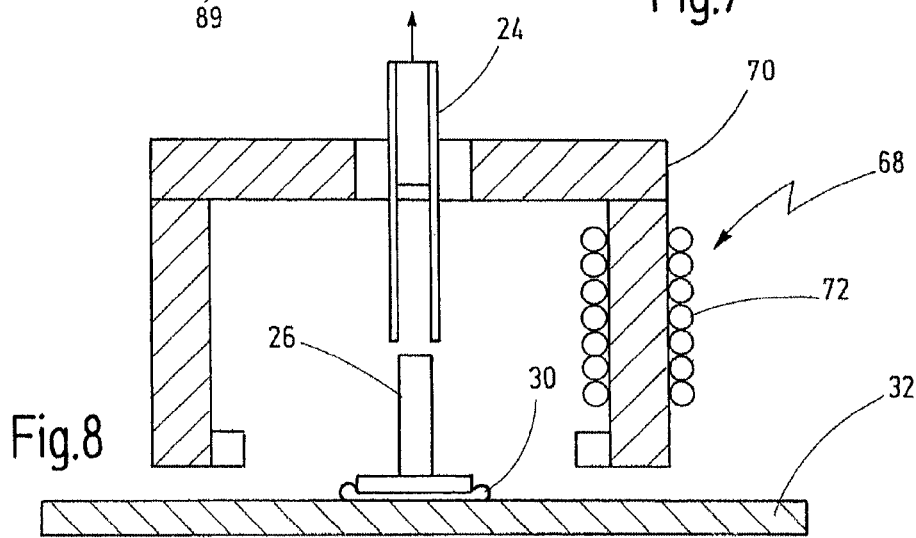
FIG. 8 shows the joining tool of FIG. 7 after the release of the adhesive-bonded fastening element.

FIGS. 6 to 8 show a further joining head 20, in which the first heating means 38 and the second heating means 44 are realized by a common heating device 36.

The heating device 36 is an inductive heating device 68, having a U-shaped field shaper 70 made of a magnetically soft material, and having an electromagnetic coil 72. The field shaper 70 has a middle piece 74, extending transversely relative to the joining axis 28. Realized in the middle piece 74 is an opening 76, through which the holding device 24 extends, in such a way that the holding device 24 can be moved, relative to the inductive heating device 68, along the joining axis 28. A first U-limb 78 and a second U-limb 80 are arranged at the ends of the middle piece 74. The ends of the U-limbs 78, 80 are designed to be placed on to the component 32. In this case, the holding device 24 is first in such a position that the fastening element 26 is spaced apart from the surface portion 34.

As shown in FIG. 6, a pre-heating step can first be performed, in which the coil 72 is supplied with a first electric current. The current flowing through the coil 72 creates a magnetic circuit 82 (in FIGS. 6 and 7, represented in black or as field lines). The magnetic flux goes through the field shaper 70 in such a way that magnetic field lines emerge from one of the U-limbs 78. The magnetic field lines then divide into first field lines 84, which penetrate the fastening element 26, or the adhesive 30 attached thereto, and into second field lines 86, which enter the component 32. The second field lines 86 extend through the component 32 as far as the end of the second U-limb 80. Further, third field lines 88 extend from the radially opposite end of the fastening element 26, or of the adhesive 30, to the end of the second U-limb 80, whereby the magnetic circuit 82 is closed.

In this way, both pre-heating of the adhesive 30 to the first temperature T1 and pre-heating of the surface portion 34 of the component 32 to the second temperature T2 can be achieved by energizing the coil 72.

The holding device 24 is then lowered, as shown in FIG. 7, in such a way that the fastening element 26 is lowered on to the component 32. The coil 72 then continues to be kept energized, with increased current if appropriate. As a result, fourth field lines 89 flow from the ends of the one U-limb, via the fastening element 26, or the adhesive 30, and via the surface portion 34, to the other U-limb 80. As a result, the adhesive 30 is heated to the third temperature T3, to effect complete curing of the adhesive.

The holding device 24 is then first released and withdrawn upwards from the fastening element 26, contrary to the joining direction, after which the inductive heating device 68 can also be raised from the component 32, as shown in FIG. 8. The joining heads 20 described above can be used both in combination with a robot 12 or, also, in combination with manual joining devices.

Figure 9:
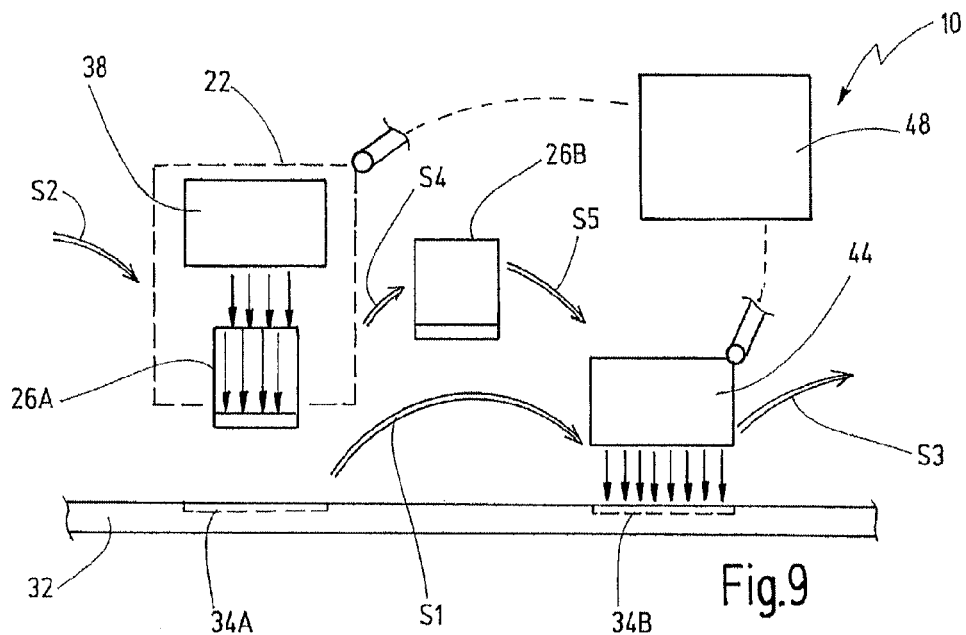
FIG. 9 shows a schematic representation of a further embodiment of a joining appliance, according to the invention, for joining a plurality of fastening elements on to components.

In the case of the embodiment shown in FIG. 9, a first fastening element 26A is to be joined on to a first surface portion 34A, and a second fastening element 26B is then to be joined on to a second surface portion 34B.

In the case of this embodiment, the joining tool 22 and the second heating means 44 are independent of one another. The representation of FIG. 9 is based on a state in which the first surface portion 34A has already been heated to the appropriate temperature T2. Then, in a first step S1, the second heating means 44 have been moved to the second surface portion 34B. Thereafter, in a second step S2, the joining tool 22, with the first fastening element 26A that, if appropriate, has already been pre-heated, is moved towards the first surface portion 34. The second surface portion 34B is then pre-heated and, substantially simultaneously therewith, the first fastening element 26A is joined on to the first surface portion 34A. In a following step S3, the second heating means 44 are then moved away from the second surface portion 34B (for example, to a third surface portion).

The joining head 22 then takes over the second fastening element 26B (step S4) and is moved towards the second surface portion 34B, as represented by a step S5.

The entire sequence is preferably effected in an automated manner, by a control device 48, which controls movements both of the second heating means 44 and of the joining tool 22.

Figure 10:
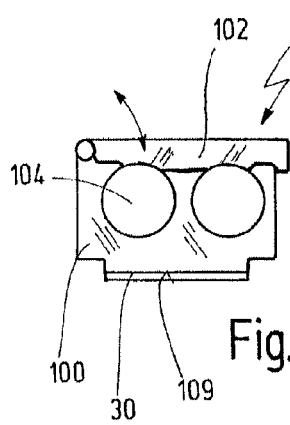
FIG. 10 shows a schematic side view of an embodiment of a fastening element according to the invention.
Figure 11:
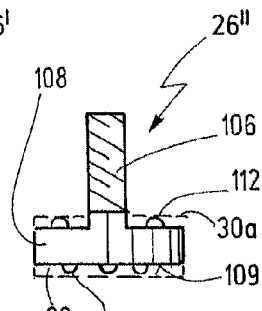
FIG. 11 shows a schematic side view of a further embodiment of a fastening element according to the invention.
Figure 12:
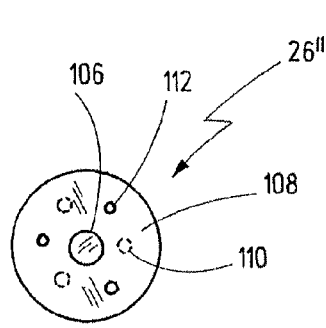
FIG. 12 shows a top view of the fastening element of FIG. 11.

Differing types of fastening elements 26 are shown in FIGS. 10 to 12. FIG. 10 shows a fastening element 26' realized as a plastic clip having a base body 100 and a cover 102 that is movable in relation thereto. Realized in the fastening element 26' are one or more receivers 104 for receiving items such as electrical lines, brake lines, etc. when the cover 102 has been closed. Realized on an underside of the base body 100 is an adhesion face 109, on to which there is applied the initially thermally meltable and subsequently thermally settable adhesive 30. The fastening element 26' can be made from a plastic. In this case, the adhesive 30 is heated, for example, directly, e.g. by means of IR radiation, hot air or the like. However, the fastening element 26' can also comprise metallic particles, at least in the base body 100, such that in this case, likewise, inductive heating of the adhesive 30 can be realized indirectly, via the base body 100.

Shown in FIGS. 11 and 12 is a further embodiment of a fastening element 26", which is realized as a stud, having a shank portion 106 (which, for example, can be provided with a screw thread) and having a flange portion 108. The adhesion face 109 is realized on the underside of the flange portion 108. A plurality of spacing protuberances 110 are provided on the adhesion face 109. The spacing protuberances 110 define the distance between the adhesion face 109 and the surface portion 34, such that it is possible, in a relatively simple manner, to press the fastening element 26" on to the surface portion 34 with a predefined force, in order to arrange the final joining position. The axial length of the spacing protuberances 110 is preferably less than the thickness of the adhesive 30 applied to the adhesion face 109, although these values are shown with approximately equal dimensions in FIG. 11.

Elevations 112 are realized on the upper side of the flange portion 108. The elevations 112 serve to space apart an inductive heating device, which constitutes the first heating means 38. However, they can also be used to define the thickness of the adhesion zone, if the adhesive is applied on a side of the adhesion flange that faces towards the shank 106 of the fastening element, as shown at 30a in FIG. 11. As shown in FIG. 12, the fastening element 26" preferably has three spacing protuberances 110 and a corresponding number of elevations 112.

The fastening element 26" can be made, for example, of metal, but can also be realized from a thermosetting plastic having metal particles embedded therein, in order thereby to enable indirect heating of the adhesive 30 applied thereto.

Figure 13:
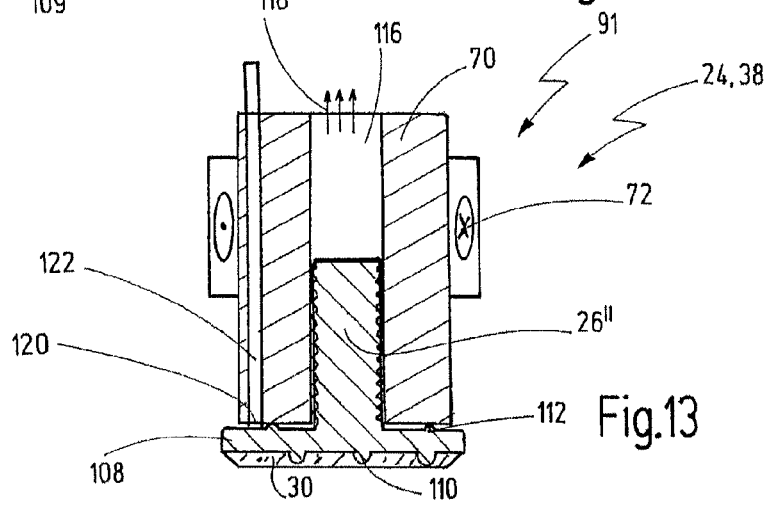
FIG. 13 shows a schematic representation of a further embodiment of a joining tool of a joining appliance according to the invention.

Shown in FIG. 13 is a joining unit 91, which constitutes the holding device 24 and the first heating means 38, and which can be used, for example, for incorporation in one of the joining appliances shown in FIGS. 1 to 8.

The joining unit 91 comprises a sleeve-type field shaper 70, which has an axial through-opening 116. A vacuum 118 can be applied to the through-opening 116, in order to hold a fastening element (for example, the fastening element 26" of FIGS. 11 and 12). In this case, the shank portion extends into the through-opening 116, the diameter of which is adapted to the diameter of the shank portion.

The field shaper 70 then rests on the elevations 112. A coil 72 is arranged around the field shaper 70. Upon energizing of the coil 72, a magnetic circuit is created, in which field lines emerge, in the axial direction, from the axial ends of the field shaper 70. The field lines enter the flange portion 108 of the fastening element 26" and heat the latter, and thereby indirectly heat the adhesive 30 applied to the underside thereof. After the fastening element 26" has been placed on to a surface portion 34, the current intensity of the coil 72 can be increased, in order to heat the adhesive 30 to the third temperature.

It is shown, at 120, that a temperature sensor can be provided at a lower end of the field shaper 70, which sensor can be used to measure the temperature ensuing in the shank portion 108. The corresponding electrical connection of the temperature sensor 120 can be effected via an axial channel 122 in the field shaper 70. As an alternative thereto, however, the temperature sensor 120 can also be of an optical type, such that only an optical signal, which, substantially, is not influenced by the coil 72, is transmitted via the channel 122.

By means of the elevations 112, the field shaper 70 can be prevented from adhering to the upper side of the flange portion 108.

The invention claimed is:

1. A method for joining a fastening element on to a surface portion of a component, the fastening element being held in a holding device of a joining tool and having an adhesion face on which is applied an adhesive that is thermally meltable and thermally settable, comprising the steps of:
    pre-heating the adhesive via a first heating source to a first temperature (T1), in order to melt the adhesive;
    pre-heating the surface portion to a second temperature (T2) via a second heating source separate from said first heating source;
    activating the joining tool to move the holding device so that the adhesion face of the fastening element is placed on to the surface portion;

thereafter performing a main heating of the adhesive at a third temperature (T3) in order to set the adhesive and thereby permanently fasten the fastening element to the component; and thereafter activating the joining tool to release the fastening element from the holding device;

wherein the pre-heating of the adhesive and the preheating of the surface portion are effected with an overlap of time.

2. The method according to claim 1, wherein the third temperature (T3) is equal to, or higher than, the first temperature (T1).

3. The method according to claim 1, wherein the pre-heating of the adhesive and/or the main heating of the adhesive including the heating of the fastening element, is effected by heat conduction from the fastening element into the adhesive.

4. The method according to claim 3, wherein the heating of the fastening element and/or the pre-heating of the component is performed by inductive heating.

5. The method according to claim 1, wherein the pre-heating of the component is performed by thermal convection and/or thermal radiation.

6. The method according to claim 1, wherein the fastening element is moved, prior to the pre-heating, into a defined spatial position in relation to the component.

7. The method according to claim 1, wherein the pre-heating of the surface portion and the placing of the pre-heated adhesion face on to the surface portion is linked through control in such a way that the placing-on is allowable only within a predefined timespan after completion of the pre-heating of the surface portion.

8. The method according to claim 1, wherein at least one first and one second fastening element are joined on to a first and a second surface portion, respectively, the main heating of the first fastening element and the pre-heating of the second surface portion being effected with an overlap of time.

9. The method according to claim 1, wherein said first and second heating sources are independently controllable.

* * * * *